US010230595B2

(12) United States Patent
Gusat et al.

(10) Patent No.: US 10,230,595 B2
(45) Date of Patent: Mar. 12, 2019

(54) METHOD AND SYSTEM FOR MONITORING NETWORKS WITH VARIABLE, VIRTUAL SERVICE RATES

(71) Applicant: International Business Machines Corporation, Armonk, NY (US)

(72) Inventors: Mitch Gusat, Langnau (CH); Georgios Kathareios, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 15/177,849

(22) Filed: Jun. 9, 2016

(65) Prior Publication Data

US 2017/0359244 A1 Dec. 14, 2017

(51) Int. Cl.
*H04L 12/26* (2006.01)
*H04L 12/24* (2006.01)
*H04L 12/835* (2013.01)

(52) U.S. Cl.
CPC .......... *H04L 43/022* (2013.01); *H04L 43/045* (2013.01); *H04L 43/0882* (2013.01); *H04L 41/12* (2013.01); *H04L 47/30* (2013.01)

(58) Field of Classification Search
CPC . H04L 43/0888; H04L 43/026; H04L 43/022; H04L 43/04; H04L 43/062; H04L 41/0613
See application file for complete search history.

(56) References Cited

U.S. PATENT DOCUMENTS

| | | | | |
|---|---|---|---|---|
| 4,870,641 A | * | 9/1989 | Pattavina | ............ H04L 12/5602 370/397 |
| 8,913,496 B2 | | 12/2014 | Ge et al. | |
| 2005/0138197 A1 | * | 6/2005 | Venables | ................. H04L 47/10 709/232 |
| 2007/0041441 A1 | * | 2/2007 | Koyabu | ........... H04N 21/44016 375/240.12 |

(Continued)

OTHER PUBLICATIONS

"Scalable High Resolution Traffic Heatmaps: Coherent Queue Visualization for Datacenters", Andreea Anghel, Robert Birke, and Mitch Gusat, IBM Research, Zurich Switzerland.*

(Continued)

*Primary Examiner* — Charles C Jiang
*Assistant Examiner* — Thad N Defauw
(74) *Attorney, Agent, or Firm* — Harrington & Smith (57) ABSTRACT

Embodiments of the invention are directed to a computer-implemented method for monitoring a computerized network comprising several nodes that are, each, configured for receiving and/or sending data packets via one or more communication channels, such that physical queues of data packets arriving at and/or departing from each of the nodes may form in said one or more communication channels. According to this method, virtual queues are maintained, wherein each of said virtual queues simulates a queue of data packets in a virtual channel associated to one of said one or more communication channels, wherein the service rate of said virtual channel can be varied. The virtual queues maintained are further monitored. Finally, this method comprises varying a service rate of one or more virtual channels, on which queues are respectively simulated by one or more of the virtual queues maintained.

20 Claims, 7 Drawing Sheets

(56) References Cited

U.S. PATENT DOCUMENTS

| | | | |
|---|---|---|---|
| 2009/0154593 A1* | 6/2009 | Diab | H04L 47/10 |
| | | | 375/295 |
| 2014/0269403 A1 | 9/2014 | Anghel et al. | |
| 2014/0281249 A1* | 9/2014 | Waldspurger | G06F 12/0802 |
| | | | 711/129 |
| 2015/0244594 A1 | 8/2015 | Kay | |

OTHER PUBLICATIONS

"Scalable High Resolution Traffic Heatmaps: Coherent Queue Visualization for Datacenters", Andreea Anghel, Robert Birke, and Mitch Gusat, IBM Research, Zurich Switzerland (Year: 2014).*

Document showing the date that "Scalable High Resolution Traffic Heatmaps: Coherent Queue Visualization for Datacenters" was presented at a conference (Year: 2014).*

Benson, Theophilus, et al., "The Case for Fine-Grained Traffic Engineering in Data Centers", INM/WREN'10 Proceedings of the 2010 Internet Network Management Conference on Research on Enterprise Network, 6 pgs.

Rasley, Jeff, et al., "Planck: Millisecond-scale Monitoring and Control for Commodity Networks", ACM SIGCOMM Computer Communication Review, Aug. 2014, 12 pgs.

A.S. Anghel, R. Birke, and M. Gusat ("Scalable High Resolution Traffic Heatmaps: Coherent Queue Visualization for Datacenters"), TMA 2014.

* cited by examiner

METHOD AND SYSTEM FOR MONITORING NETWORKS WITH VARIABLE, VIRTUAL SERVICE RATES

BACKGROUND

The invention relates in general to the field of computer-implemented methods and systems for monitoring data communication networks, in particular for monitoring queues at switches or nodes of such networks.

The monitoring, control, management and optimization of large, networked computerized systems (such as datacenters, high-performance computing (HPC) systems, clouds, and transport [street/rail] networks) is a growing challenge, owing to the lack of (network) observability in such systems. Large networks are distributed and decentralized systems that comprise thousands to millions of physical and/or virtual queues, and carry large numbers of packet-based flows.

In the example of a cloud, HPC or datacenter network (DCN), these queues are interconnected in a topological graph, which typically is a k-ary n-tree such as fat-tree, Clos, dragonfly or a k-ary n-cube such as a mesh or hypercube.

Such DCN and HPC fabrics may convey Tera to Peta packets of traffic across millions of ephemeral (mice) and persistent (elephants) flows. Despite decades of research in communications and transport networks, the nature and characteristics of such traffic remain hard to observe and comprehend. Hence a reduced capacity to control, schedule and optimize such networks. In particular, the direct observation of multitude of queues is not (or hardly) possible inside a large network such as a DCN, particularly at the temporal granularity of a few packets (nanosecond to microsecond scale).

A scheme for building a space-time correlated global sampling system for a multitude of queues has been introduced A. S. Anghel, R. Birke, and M. Gusat ("Scalable High Resolution Traffic Heatmaps: Coherent Queue Visualization for Datacenters"), TMA 2014.

SUMMARY

According to an embodiment, a computer-implemented method for monitoring a computerized network is provided, wherein said network comprises several nodes that are, each, configured for receiving and/or sending data packets via one or more communication channels, such that physical queues of data packets arriving at and/or departing from each of the nodes may form in said one or more communication channels, the method comprising: maintaining virtual queues, wherein each of said virtual queues simulates a queue of data packets in a virtual channel associated to one of said one or more communication channels, wherein the service rate of said virtual channel can be varied; monitoring the virtual queues maintained; and while maintaining and monitoring said virtual queues, varying a service rate of one or more virtual channels, on which queues are respectively simulated by one or more of the virtual queues maintained.

According to another embodiment, a computer program product for monitoring a computerized network is provided, wherein said network comprises several nodes that are, each, configured for receiving and/or sending data packets via one or more communication channels, such that physical queues of data packets arriving at and/or departing from each of the nodes may form in said one or more communication channels, the computer program product comprising a computer readable storage medium having program instructions embodied therewith, the program instructions being executable by one or more processors of one or more entities, to cause an apparatus to perform: maintaining virtual queues, wherein each of said virtual queues simulates a queue of data packets in a virtual channel associated to one of said one or more communication channels, wherein the service rate of said virtual channel can be varied, as opposed to an actual service rate of the associated one of said one or more communication channels; monitoring the virtual queues maintained; and while maintaining and monitoring said virtual queues, varying a service rate of one or more virtual channels, on which queues are respectively simulated by one or more of the virtual queues maintained.

According to another embodiment, a computerized system configured for monitoring a computerized network is provided, wherein said network comprises several nodes that are, each, configured for receiving and/or sending data packets via one or more communication channels, such that physical queues of data packets arriving at and/or departing from each of the nodes may form in said one or more communication channels, the system comprising a monitoring unit connectable to said network to establish data communication therewith, and wherein said monitoring unit is an electronic circuit or processing unit that is programmed, designed, adapted or configured to: maintain virtual queues, wherein each of said virtual queues simulates a queue of data packets in a virtual channel associated to one of said one or more communication channels, wherein the service rate of said virtual channel can be varied, as opposed to an actual service rate of the associated one of said one or more communication channels; monitor the virtual queues maintained; and while maintaining and monitoring said virtual queues, vary a service rate of one or more virtual channels, on which queues are respectively simulated by one or more of the virtual queues maintained.

Computerized systems, methods, and computer program products embodying the present invention will now be described, by way of non-limiting examples, and in reference to the accompanying drawings.

BRIEF DESCRIPTION OF SEVERAL VIEWS OF THE DRAWINGS

The accompanying drawings show simplified representations of systems (or parts thereof) and computerized methods, as involved in embodiments. Similar or functionally similar elements in the figures have been allocated the same numeral references, unless otherwise indicated.

DETAILED DESCRIPTION OF EMBODIMENTS OF THE INVENTION

In reference to FIGS. 1, 5, 6 and 7, an aspect of the invention is first described, which concerns a computer-implemented method for monitoring a computerized network 100. The network 100 comprises several nodes (labelled 0-11 in FIGS. 3, 4 and 7). Each of the nodes is configured for receiving and/or sending data packets 21-23 via one or more (physical) communication channels, such that physical queues 20 of data packets arriving at and/or departing from each of the nodes 10 may form in communication channels between the nodes.

Figure 1:
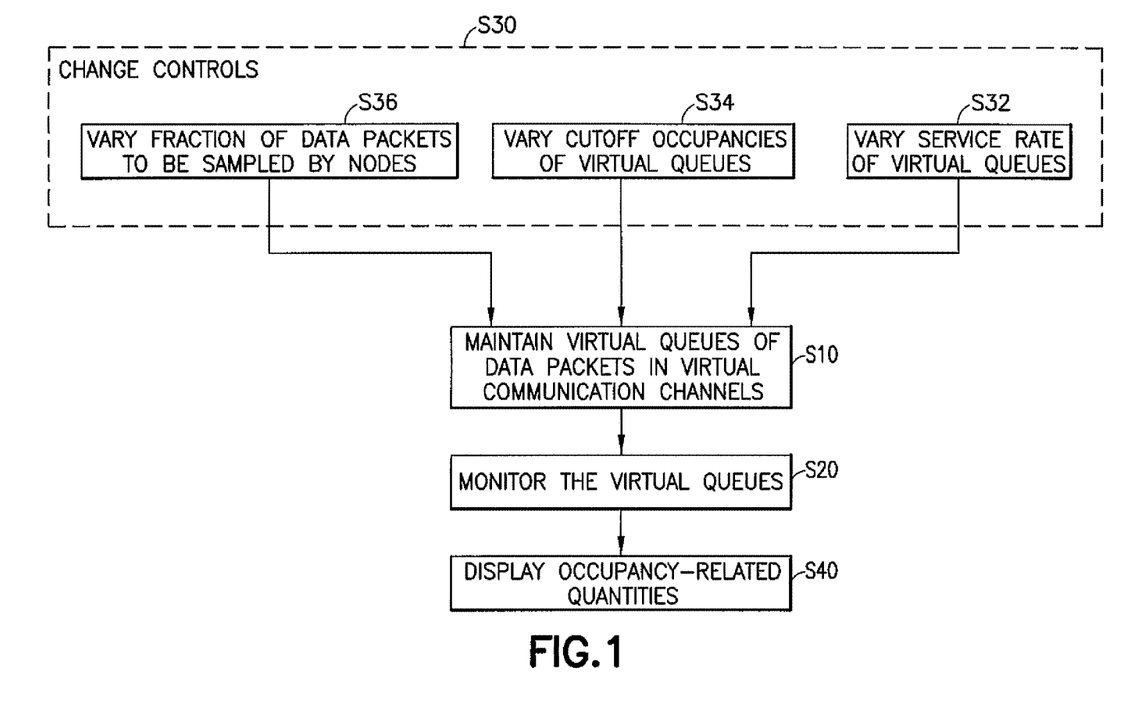
FIG. 1 is a flowchart illustrating high-level steps of a method for monitoring a computerized network, in accordance with exemplary embodiments.

The monitoring basically revolves around three main steps: virtual queues 20a (FIG. 6) are maintained (step S10 in FIG. 1); the virtual queues are monitored (step S20 in FIG. 1); and different controls are changed (step S30 in FIG. 1). Each of said virtual queues simulates a queue of data packets 21-22 in a virtual communication channel 30a. The latter is associated to and can be compared with a physical communication channel 30 of the network. However, and as one may realize, the service rate of such a virtual channel can be varied, as opposed to an actual service rate of a physical channel. The service rate of a channel is synonymous with the channel capacity (also called link capacity of a channel), a link being synonymous with a communication channel.

Figure 5:
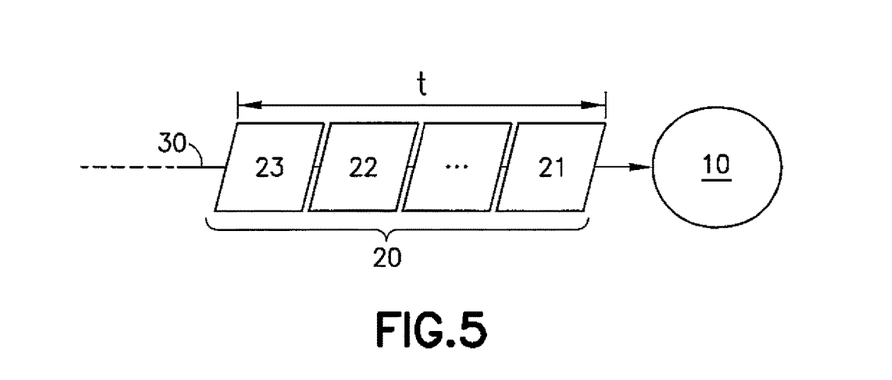
FIG. 5 illustrates data packets queuing in a given communication channel, as involved in embodiments.
Figure 6:
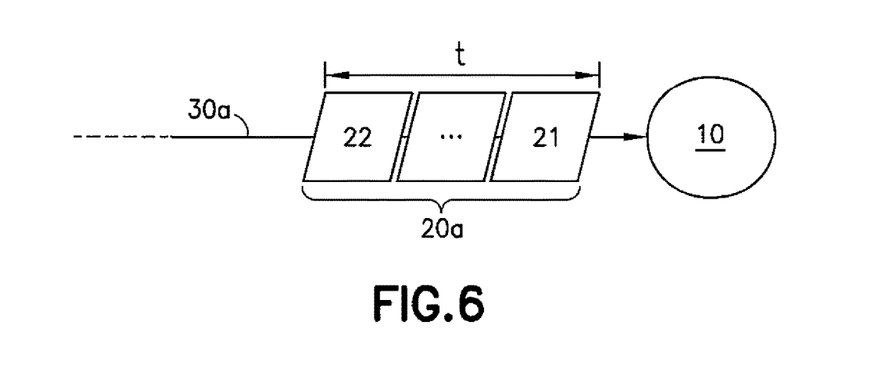
FIG. 6 illustrates data packets queuing in a virtual channel, corresponding to the physical channel depicted in FIG. 5, but having a service rate set to a higher value than the actual service rate of said physical channel, in accordance with exemplary embodiments.

A virtual queue 20a is for instance schematically depicted in FIG. 6, which represents a virtual channel 30a in which data packets 21-22 are conveyed, so as to form a virtual queue 20a during a given time t. The situation in FIG. 6 is very much comparable to that of FIG. 5, which depicts a physical channel 30, in which data packets 21-23 are conveyed, so as to form a physical queue 20 during that same period of time t. However, because the service rate of the virtual channel is artificially modified, the number of packets counted as packets queuing on the virtual channel 30a may differ from the actual number of packets counted as part of the queue 20 on the physical channel 30. In the example of FIGS. 5 and 6, it is assumed that the service rate of the virtual channel 30a is higher than the actual service rate of the physical channel 30, such that less packets (i.e., 2 instead of 3) are counted as part of the virtual queue 30a during the time period t, in this example. As the service rate is higher, the virtual queue indeed tends to be smaller than the physical queue. Namely, as packets enter and leave the queue (e.g., simultaneously in a FIFO order), a channel with higher service rate tends to "empty" its queue faster and thus have a smaller queue occupancy.

For example, principles similar to the so-called "Adaptive Virtual Queue" (or AVQ) algorithm may be used, in order to maintain virtual queues. E.g., data packets may be counted as they arrive at a node (i.e., as they are buffered in a real, physical queue), so as to update a corresponding virtual queue to reflect the new arrival.

The virtual queues maintained are monitored S20, using any suitable automatic method. The monitoring may be supervised by a human operator, if necessary, via a suitable graphical user interface (GUI).

Remarkably, the present method further provides an adjustable control, whereby the (virtual) service rate of one or more virtual channels 30a may be varied S32, while maintaining S10 and monitoring S20 said virtual queues. That is, an algorithm, or a human operator may vary the service rate(s) of one or more virtual channels, i.e., the virtual links to/from one or more of the nodes. For example, an operator may choose to vary uniformly the virtual service rates of all virtual channels, for which virtual queues are monitored, in a same extent. In variants, the virtual service rates may be varied independently for each virtual channel, at least in a certain extent, or for subsets thereof. The virtual channels 30a are channels on which queues of data packets are simulated by the virtual queues 20a as otherwise maintained S10 and monitored S20 by the present method.

Using virtual queues makes it possible to vary, i.e., both decrease and increase, the service rate of the virtual queues, and notably with respect to their associated physical queues. Indeed, a service rate of a virtual channel can be varied, as opposed to an actual maximal service rate of the associated communication channel. This enables the monitoring method to speed-up and slow-down, respectively, the temporal evolution of the monitored data, e.g., the traffic matrices of interest. The virtual service rate accordingly provides a control option which may be tuned, e.g., to anticipate potential hotspots, bottlenecks, etc., for example to detect congestion before it actually occurs, or to solve already identified issues.

Based on the above monitoring method, appropriate steps may then be taken to solve issues or prevent potential issues (e.g., congestion) to occur, in the network, by way of automated (or partly automated) methods, which can be implemented complementary to the above monitoring method. Now, that virtual queues be monitored does not preclude monitoring actual queues forming in the physical communication channels. On the contrary, the actual queues shall preferably be monitored too, in addition to (e.g., simultaneously with) monitoring the virtual queues.

Virtual queues simulate, or account for, queues of data packets in virtual communication channels, just like actual queues account for queues of data packets in physical communication channels. Although they are an artificial construct, virtual queues are not more artificial than physical queues; they are just the result of counting data packets in a different way. However, the virtual service rates can be artificially constrained and, in the present context, even varied, contrary to physical channels, whose service rates (also called link capacities) are determined by their design, the materials used to physically link the nodes, etc., as known per se.

Virtual queues as used herein compare to the concepts of shadow queues or phantom queues as sometimes used in the literature. However, typically the service rates of the virtual channels are typically set to a value that is less than the actual service rate of the corresponding physical communication channels. The service rates of virtual channels are furthermore typically kept constant (and not varied), at least not as a control option for the purpose of monitoring network traffics.

The present methods may be implemented in a centralized way, at an entity (such as, for example, computerized unit 101 in FIG. 7) that is external to but in data communication with the nodes 0-11 of the network 100. In variants, the present methods may be implemented in a distributed fashion, by part or all of the nodes 0-11 of the network 100 and/or by several external entities, and according to any suited network communication protocol.

In embodiments, the service rates of the virtual channels are varied S32 within a restricted interval, e.g., an interval that is between 10% and 400% of the actual service rate of the physical communication channels. Although larger intervals, e.g., between 1% and 1000%, may be contemplated, the narrower range (10-400%) turned out to be most useful in practice, for the purpose of monitoring network traffics.

Varying the service rate of the virtual queues may be compared to actuating a diaphragm of a camera, to regulate the amount of light that passes through the lens. Similarly, varying the service rate of the virtual channels impacts the flow of data packets conveyed in the virtual channels.

In all cases, the service rates may be varied so as to reach a value that exceeds the actual, maximal service rate (i.e., 100%) of the corresponding physical channels. In order to exceed the maximal service rate (100%), one may for instance simulate an increase of the signaling speed of the virtual channels, because mechanisms that solely act on the interpacket gaps may only help in achieving 100% of the virtual link capacities, as explained below in detail.

In embodiments discussed below, other control mechanisms may be implemented, in addition to varying the service rate of the virtual queues. In particular, the present methods may further comprise varying S34 cutoff occupancies as to a queue occupancy of one or more of the virtual queues maintained, while maintaining S10 and monitoring S20 the virtual queues.

In particular, one may vary S34 a lower cutoff occupancy, under which a virtual queue occupancy is considered to be zero (i.e., the queue is considered to be empty) by the computerized methods used for the purpose of monitoring the computerized network 100. In addition, one may vary S34 an upper cutoff occupancy, above which a queue occupancy is considered to be maximal.

As it may be realized, varying cutoff occupancies provides additional control as to the sensitivity of the monitoring methods and further allows to save computational resources otherwise required to simulate (or account for) the virtual queues. In embodiments, only the lower cutoff occupancy is varied, which allows to control the "noise" caused by data packets in virtual channels, in the low occupancy regime. In other embodiments, only the upper cutoff occupancy is varied, to minimize computations. Varying both the lower and upper cutoff occupancies makes it possible to control the dynamic range of signal-to-noise ratios and, in particular, to focus on traffic conditions of interest, e.g., a sub-critical regime, while monitoring the network 100. Varying cutoff occupancies may be compared to varying the sensitivity of the medium (e.g., glass plates, films, or digital sensors) used in photography.

In embodiments, another type of control may advantageously be used, in addition to varying service rates and, if necessary, cutoff occupancies. Indeed, the present methods may further comprise varying S36 a fraction of the data packets arriving at and/or departing from the nodes, and which are to be sampled by the nodes. The fraction of the sampling packets is varied while maintaining S10 and monitoring S20 the virtual queues, for the purpose of monitoring the network 100.

This fraction may be varied in absolute time (i.e., as an inverse frequency of sampling) or as a percentage of arriving/departing packets. This fraction is typically in direct relation with the probability of packet sampling, which may be expressed either relatively as a percentage of the arrival events (e.g., 0.01% of the arrivals, i.e., 1 out of 10 000 arrivals, will trigger a local sample). In variants, this fraction is based on absolute time units, e.g., with respect to a local or a globally synchronized clock.

Different sampling mechanisms may be involved, which mechanisms are known per se. Beyond the fraction of packets to be sampled, the sampling mechanisms may involve a number of parameters, for example: a minimal/maximal number of bytes to be sampled per packet sampled; types of data to be sampled (or not to be sampled), etc.

Figure 7:
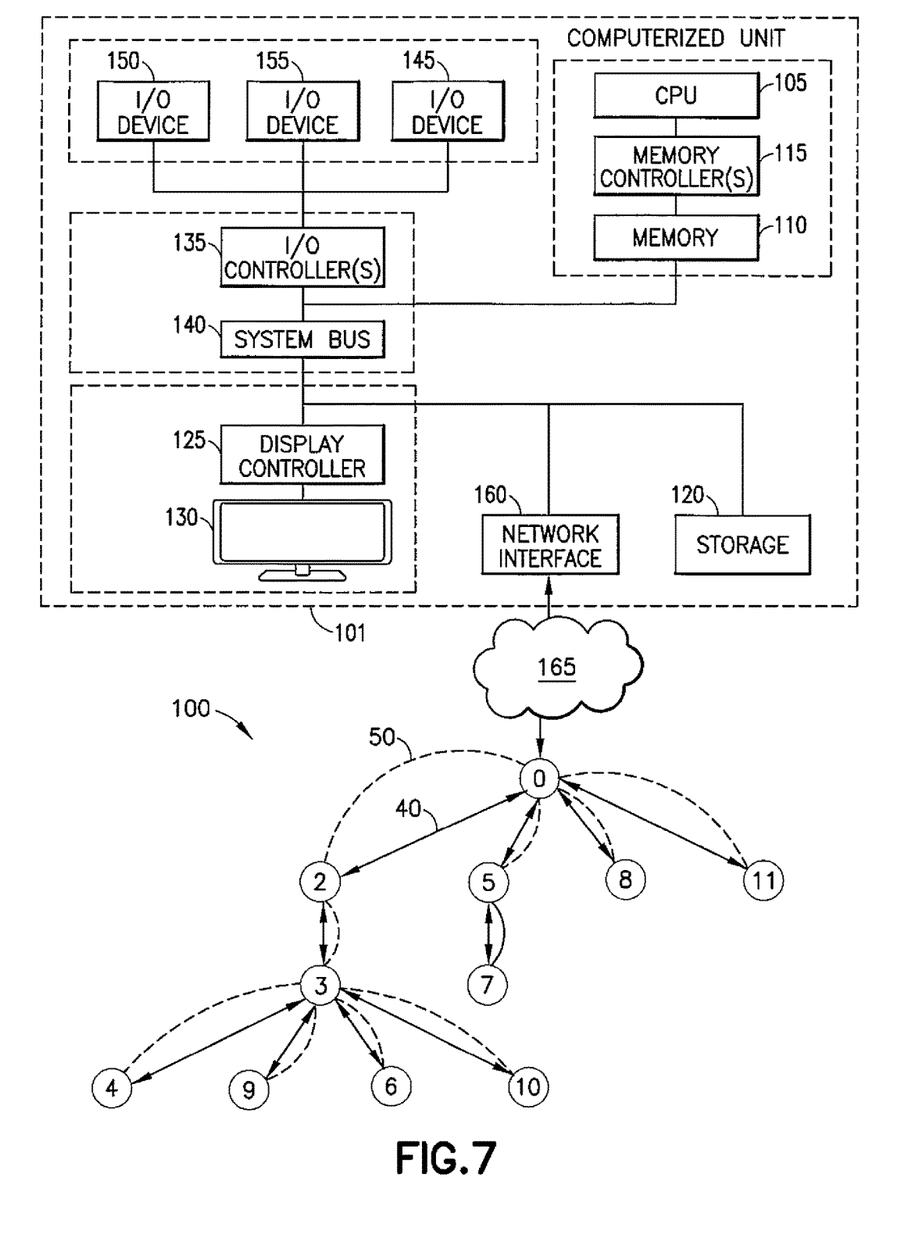
FIG. 7 schematically represents a general purpose computerized system (e.g., an external entity), communicating with switches of a network, and suited for implementing method steps in accordance with exemplary embodiments.

The execution of the sampling mechanism at the nodes may be triggered from the monitoring entity, such as computerized unit 101 in FIG. 7, e.g., by sending packets interpretable and/or executable by the nodes 0-11, for each of said nodes to sample a queue of data packets queuing at said each of said nodes. Such packets may be sent through a data path 40 of the network or through a control path 50 of the network. Sending such data packets via the data path allows for both scalability and speed, as opposed to using the control path. This way, the sampling mechanism can be globally started and/or stopped from the external entity.

The external entity may for instance be hardware, i.e., a physical machine (e.g., a server, running the monitoring process), or software (e.g., a user application, implementing this monitoring process), or more generally, a set of machines (physical and/or virtual), interacting so as to implement the monitoring process. The external entity may for instance involve an operator, a user application, a monitoring entity, etc. The monitoring entity may also use the sampled data returned by the nodes to perform specific operations or analyses thereon.

The nodes may for example implement a QCN-type of protocol, allowing them to sample the queues. The data sampled may, in particular, relate to queues of data to be processed, being processed or having been processed (if the sampling is carried out after the nodes have processed the data packets). The data sampled may most simply relate to the size/occupancy of the queues, their evolution fill rate or any other temporal derivative thereof. Queues are typically estimated based on the rate of incoming packets (and the service rate) vs. processed/leaving packets.

Note that not all the nodes of a network may be targeted by the present monitoring methods. Instead, present methods may be implemented for a restricted set of nodes which nonetheless still form a network as defined above.

The collection of the samples may be performed in a distributed manner e.g., the nodes return the samples according to an IP address of the external entity (e.g., as included in the received execution packets or according to instruction specified in such a packet) or in a centralized way (the nodes systematically return samples to a same recipient, such as computerized unit 101 in the example of FIG. 7).

As one may realize, varying the fraction of the data packets to be sampled at the nodes compares to varying the exposure time (shutter), in photography. Now, just like photography relies on three pillars that are the aperture, the sensitivity and the shutter speed, present methods may involve mixing the three types of control discussed above. I.e., varying the service rate of virtual channels and the fraction of the data packets to be sampled make it possible to regulate the flow of data packets and the packets to be eventually sampled, just like adjusting the aperture and shutter allows to adjust light coming into the camera. Still, varying the cutoff occupancies may impact the optimal (virtual) service rates and fractions of data packets to be sampled, just like the amount of light needed is determined by the sensitivity of the medium used, in photography. Thus, in preferred embodiments, the three types of control discussed above (virtual service rates, fractions of packets to be sampled and cutoff occupancies) are jointly or concurrently varied, for the purpose of monitoring the network. For example, an operator may attempt to concurrently optimize such controls, via a user interface of the monitoring system, which includes a monitoring entity, as discussed later in detail, in reference to FIG. 7.

Figure 2:
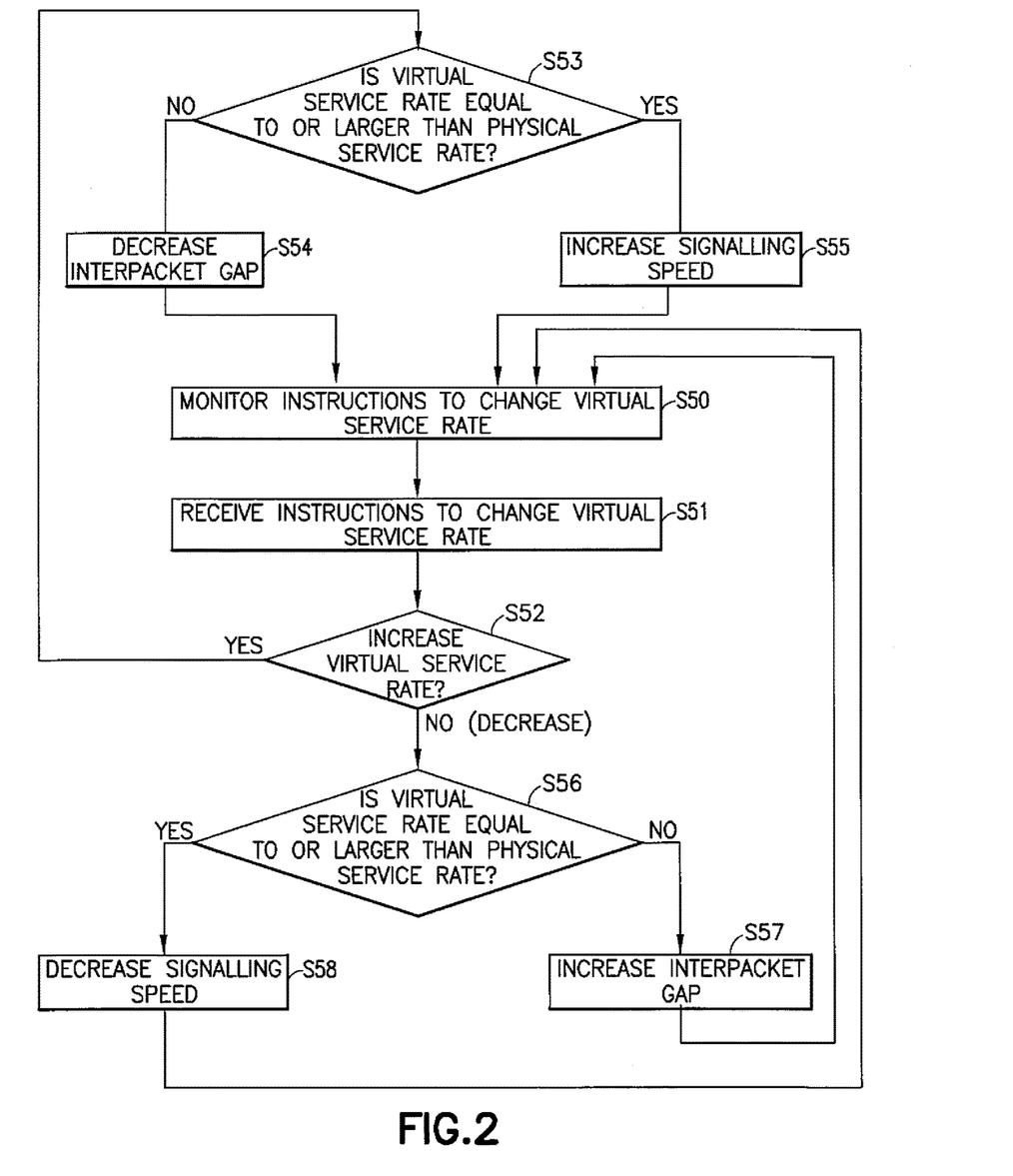
FIG. 2 is a flowchart illustrating high-level steps of a method for varying a service rate of a virtual communication channel, in accordance with exemplary embodiments.

Referring to FIG. 2, embodiments are now described, wherein the step of varying the virtual service rate (step S32) involves simulating a variation S54, S57 in the interpacket gaps, i.e., the gaps between packets conveyed on the virtual channels. This can notably be achieved by simulating a flow control mechanism on the virtual channels. In such cases, one simulates receiver nodes that impose S54, S57 the interpacket gap between packets sent by the transmitter nodes on the virtual channels. In particular, a standard link-level flow control may be simulated. In variants, any other suitable Ethernet flow control mechanism may be relied on, whereby receivers controls the transmitter injection rate. In other variants, a direct control of the local transmitters' rates may be simulated.

As one may realize, changing the interpacket gaps allows the service rate to be varied between 0 and 100% of the associated physical channels, i.e., a zero interpacket gap may allow to exploit 100% of the link capacity, in the best case. Thus, another mechanism is needed where one wishes to increase S55 the virtual service rates, for them to exceed 100% of the normal service rate of their associated physical channels, as illustrated at step S55 of FIG. 2.

In that respect, in embodiments, increasing S55 the virtual service rate (above the maximal link capacity) is achieved by simulating an increase of the signaling speed of the virtual channels. As noted earlier, this increase will preferably be limited to 400% of the actual signaling speed of the physical communication channels. In a real network, the signaling speed may be modified by logically modifying and/or physically modifying the physical link. Each of these can be simulated to obtain comparable effects in the virtual channels.

Note that the mechanisms evoked above (flow control, signaling speed) are mechanisms that impact the manner the data packets in virtual channels are counted and accounted for. Such mechanisms can thus be regarded as simulations. However, they do not preclude the possibility for implementing comparable mechanisms in the physical communication channels, so as to modify physical properties and/or data communication protocols of the physical communication channels of the network. Yet, any actual modifications of the network may, in turn, be taken into account by the present monitoring methods, as parameters for the simulated, virtual queues.

In detail, the flowchart of FIG. 2 starts with monitoring instructions to change the virtual service rates, as received from, e.g., a human operator or an automaton, step S50. Upon receiving such instructions, S51, the algorithm proceeds to:

If an increase of the virtual service rate is sought, step S52/Yes:
Test whether the virtual service rate already exceeds the maximal, physical service rate, S53; and
If so, instruct to further increase the signaling speed, S55; or
If not, instruct to decrease the interpacket gap, S54, e.g., using any suited link-level flow control mechanism;
If on the contrary, a decrease of the virtual service rate is sought, step S52 (No):
Test whether the virtual service rate still exceeds the maximal, physical service rate, S56; and
If so, instruct to decrease the signaling speed, S58, or
If not, instruct to increase the interpacket gap, S57.

As seen, this algorithm favors a mechanism relying on interpacket gaps, whenever possible, to more closely reflect operation of a real network. However, other strategies can be contemplated. In addition, the flowchart of FIG. 2 assumes that virtual service rates are varied similarly for all virtual channels, for simplicity. However, it need not be so, e.g., the service rates may be varied independently, in a certain extent, if necessary.

Figure 3:
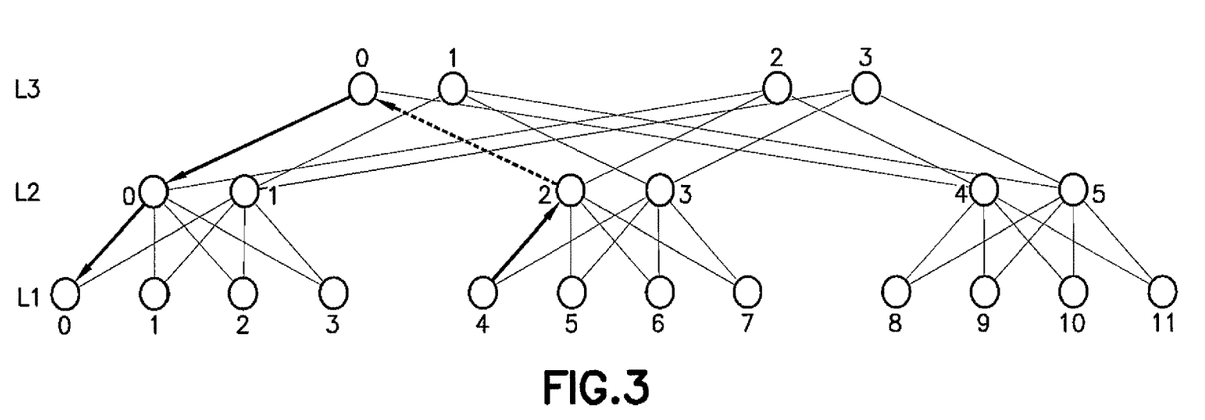
FIG. 3 shows a folded topology representation of switches (networking nodes) of a computerized network, in accordance with exemplary embodiments.
Figure 4A:
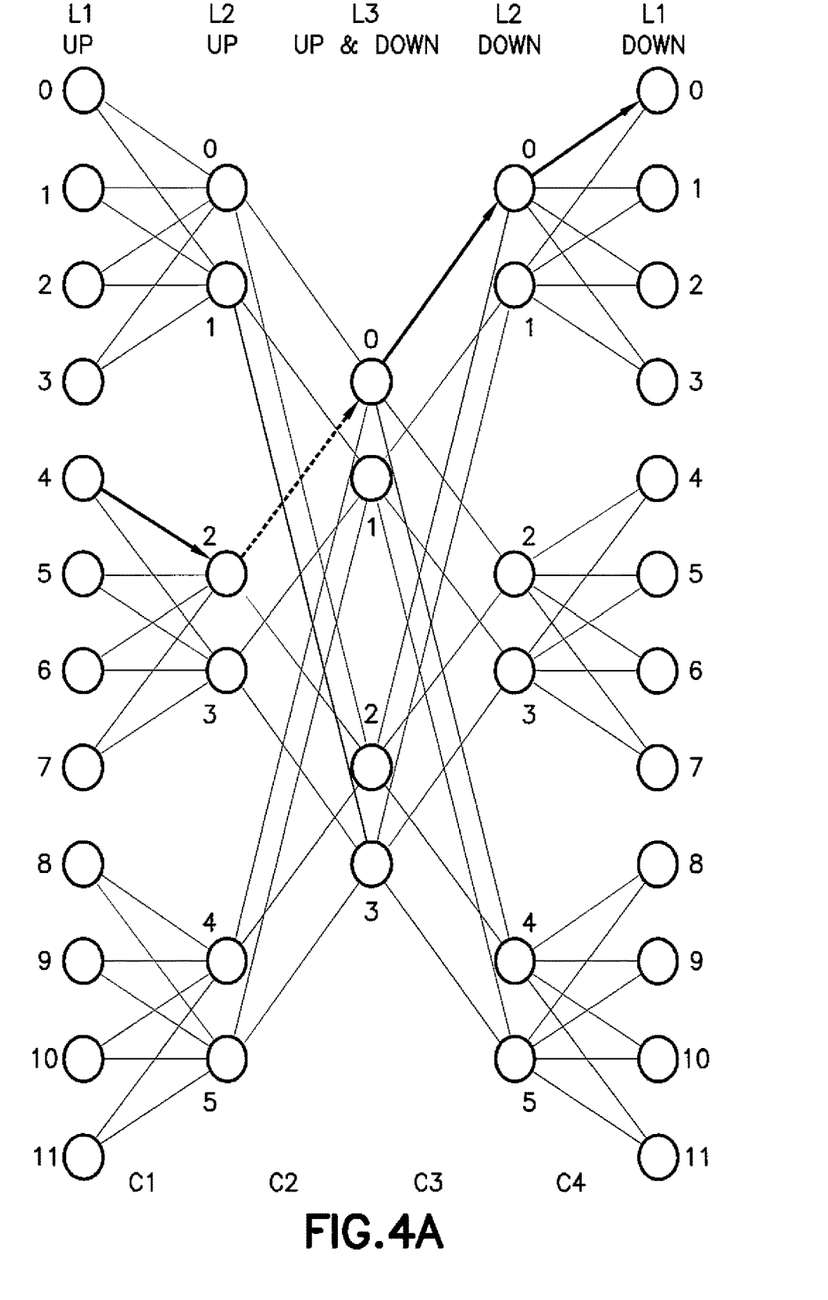
FIGS. 4A-4C schematically illustrate the mapping of data samples received from the switches onto a data structure (2D representation), according to an isomorphic transformation of a network topology of the switches, in accordance with exemplary embodiments.
Figure 4B:
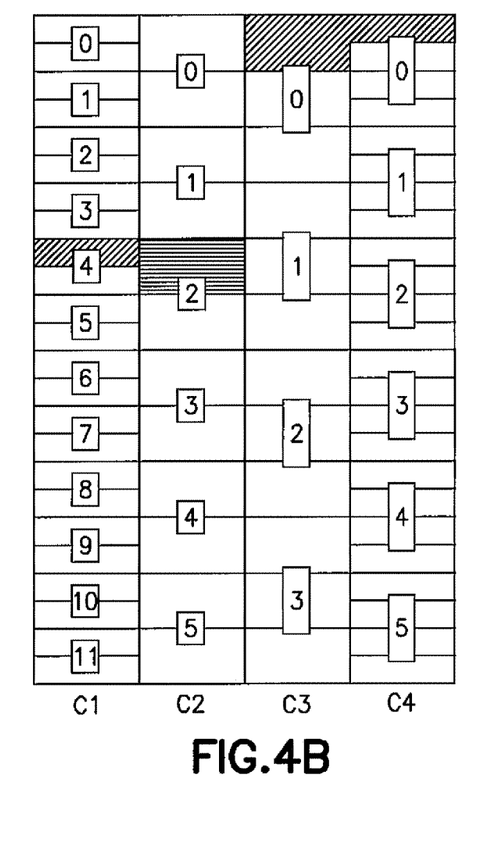
Figure 4C:
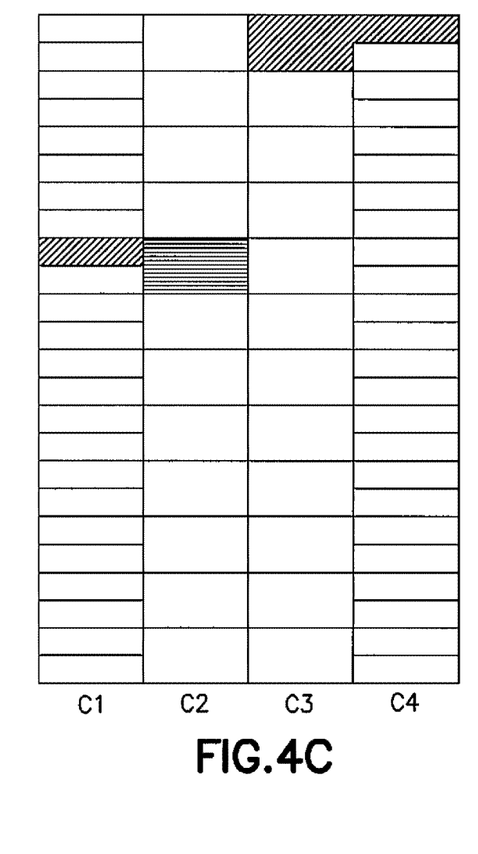

Referring now to FIGS. 3-4C, the present methods may, in embodiments, further comprise steps of dynamically interpreting outcomes of (i.e., results as obtained from) the step of monitoring S20, to display S40 images of quantities based on occupancies of said virtual queues, as for instance schematically depicted in FIG. 4C. Such quantities may notably be derived from the data collected from the nodes 0-11, by the monitoring entity.

In embodiments, this interpretation may involve an isomorphic transformation of the network topology of the nodes, to map such quantities onto an array representing said virtual queues, so as to enable, e.g., time-synchronous snapshot images of the network. The quantities of interest are typically mapped onto a multidimensional array or, more generally, a multi-dimensional data structure. Then, the multi-dimensional data structure may, if needed, be represented as a map (e.g., a heat map, as assumed in FIG. 4C, or a density plot or a geospatial map, etc.). Examples of suitable isomorphic transformations are proposed in the paper "Scalable High Resolution Traffic Heatmaps: Coherent Queue Visualization for Datacenters", cited in the background section.

In embodiments, the quantities at stake comprise occupancies of said virtual queues and gradients of said occupancies. Preferably, the occupancies and gradients thereof are rendered by varying, in the displayed S40 images, and at each cell of the array, a brightness and a color, respectively. Typically, the image synthesis involves an additive composition of one or more values. For example, in the QCN case, one may encode a 16 bits occupancy as luminance/brightness, and a 16 bits occupancy gradient velocity as color red/green/blue (not shown).

For example, FIG. 3 depicts a network 100 that comprises several switches 0-11 that are, each, configured for processing data 21-23 queuing thereat (as otherwise illustrated in FIG. 5). More in detail, FIG. 3 illustrates a folded topology representation of an extended generalized fat tree (hereafter XGFT), namely a XGFT(3;2,4,3;1,2,2), where links are bidirectional. Node levels start at 0 from bottom to top (L0 to L3). Nodes within a level start at 0 from left to right. For simplicity reasons, only the switch levels (L1, L2, L3) are shown. L0 is populated with 2 (nodes)·12 (L1-switches)=24 (nodes). One particular path (from switch 4 on L1 to switch 0 on L1) is highlighted. The dashed link represents the upstream queue of; e.g., port 0 at switch 2 on L2.

As illustrated in FIG. 4, the data samples collected by the entity may be mapped onto a heat map and the latter displayed to a user, an operator, etc., e.g., to enable time-synchronous snapshot images of the occupancy of the switch queues in the network. A heat map represents a 3D data structure as a structured image, where 'pixels' are color-coded, blackened, or otherwise patterned, and their intensity varied so as to render the occupancies of the virtual queues and gradients thereof.

The heatmaps can be used in a variety of manners from the network operator. As a visualization of the state of the network, they enable fast and easy detection of congestion. For example, detection of anomalies and malfunctions of the network. Additionally, the heatmaps could be used to increase efficiency of the network, e.g., by redirecting traffic away from hotspots.

FIG. 4 illustrates a possible example of spatial mapping example. Intermediate FIGS. 4A and 4B show how the XGFT of FIG. 3 can be mapped onto the heat map of FIG. 4C.

FIG. 4A unfolds and rotates the topology of FIG. 3 by 90 degrees. In the representation of FIG. 4A, links are unidirectional: the traffic flows from left to right. Each level corresponds to the up-/down-stream direction. All figures (4A-4C) highlight the same exemplary path from switch 4 on L1 to switch 0 on L1. Similarly, the dashed link highlights the send queue(s) of port 01 at switch 2 of level 2 (L2). Each link level in FIG. 4A corresponds to a column in FIGS. 4B and 4C. Each cell in a column represents (top-down) the output queues ordered by: (i) the switch and (ii) the port within that switch. E.g., C3 shows the downstream output queues of the L3 switches: 4 switches·3 ports·1 queue=12 queues. Typical current switches have 1 to 4 hardware queues per port, but for clarity a single queue per port is assumed in this example, although the one skilled in the art may easily generalize this to several queues.

The mapping depicted in FIGS. 4A-4C is merely an illustrative, pedagogical example. In particular, the map of FIG. 4C represents blackened or patterned 'pixels' (rectangles), or cells, among blank cells, where the black/patterned cells vs. blank cells encode binary information, i.e., a load is detected (black/patterned cells), or not (blank cells), amongst links whose service rate is varied, according to the present methods. Yet, in real implementations, the occupancies and gradients of the queues shall preferably be rendered by modulating the brightness and color of the cells, as mentioned earlier.

In addition, the mapping technique used in FIG. 4 is only one of many possibilities to enable visual monitoring. Keeping in mind current screen resolutions and formats, one understand that hundreds to thousands of queues may be monitored, using an isomorphic transformation. However, automated analysis (e.g., as notably enabled by advanced computer-aided analysis) shall preferably rely on data mapped on multidimensional arrays (gathering many parameters per queue per switch, and if necessary per port).

Referring now to FIG. 7, and according to another aspect, the invention can also be embodied as a computerized system (e.g. computerized unit 101) configured for monitoring a computerized network 100. According to the example in FIG. 7, the network 100 comprises several nodes 0-11 that are, each, configured for receiving and/or sending data packets 21-23 via communication channels, as described earlier. The computerized system comprises a monitoring unit, or monitoring entity, which is connectable to the network 100, so as to establish data communication therewith. Technically, said monitoring unit is an electronic circuit or a processing unit that is programmed, designed, adapted or configured to perform steps such as described earlier in reference to FIGS. 1 and 2. Namely, the monitoring unit maintains and monitors virtual queues 20a, and further proceeds to vary the service rate(s) of the virtual channels 30a, upon receiving instructions therefor, and according to principles already discussed earlier.

In embodiments, the computerized system further comprises a graphical user interface, or GUI. The monitoring unit may thus dynamically interpret outcomes of the monitoring to display, via the GUI, images of quantities based on occupancies of said virtual queues, as discussed earlier in reference to FIG. 4.

More generally, this computerized system can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

For instance, the computerized unit 101 depicted in FIG. 7 is a general-purpose computer, and may be regarded as being, hosting or otherwise enabling the functionalities of an "external entity", or "monitoring entity" as defined earlier. In exemplary embodiments, in terms of hardware architecture, as shown in FIG. 7, the computerized unit 101 includes a processor 105, memory 110 coupled to a memory controller 115, and one or more input and/or output (I/O) devices 145, 150, 155 (or peripherals) that are communicatively coupled via a local input/output controller 135. The input/output controller 135 can be, but is not limited to, one or more buses 140 or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computerized unit101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 7, the software in the memory 110 includes methods described herein in accordance with exemplary embodiments and a suitable operating system (OS). The OS essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 145-155 may include other hardware devices.

In addition, the I/O devices 145-155 may further include devices that communicate both inputs and outputs. The computerized unit 101 can further include a display controller 125 coupled to a display 130. In exemplary embodiments, the computerized unit 101 can further include a network interface or transceiver 160 for coupling directly to the network 100 or (as assumed in FIG. 7) to an intermediate network 165, and in turn communicate with switches 0-11 of the network 100.

The network 165 transmits and receives data between the computerized unit 101 and the network 100. Each of the networks 100 and 165 may possibly implemented in a wireless fashion, e.g., using wireless protocols and technologies, such as WiFi, WiMax, etc. The network 100 or 165 may be a fixed wireless network, a wireless local area network (LAN), a wireless wide area network (WAN) a personal area network (PAN), a virtual private network (VPN), intranet or other suitable network system and includes equipment for receiving and transmitting signals. The network 100 or 165 can also be an IP-based network for communication between the unit 101 and any external server, client and the like via a broadband connection. In exemplary embodiments, the network 100 or 165 can be a managed IP network administered by a service provider. Besides, the network 100 is packet-switched network such as a LAN, WAN, Internet network, etc. The network 165 is preferably a packet-switched network too.

If the computerized unit 101 is a PC, workstation, intelligent device or the like, the software in the memory 110 may further include a basic input output system (BIOS). The BIOS is stored in ROM so that the BIOS can be executed when the computer 101 is activated.

When the computerized unit 101 is in operation, the processor 105 is configured to execute software stored within the memory 110, to communicate data to and from the memory 110, and to generally control operations of the computerized unit 101 pursuant to the software. The methods described herein (in respect of the computerized unit101) and the OS, in whole or in part are read by the processor 105, typically buffered within the processor 105, and then executed. When the entity methods described herein (in respect of the computerized entity 101) are implemented in software, the methods can be stored on any computer readable medium, such as storage 120, for use by or in connection with any computer related system or method.

Next, according to another aspect, the invention can be embodied as a computer program product for monitoring a computerized network such as described above. The computer program product comprises a computer readable storage medium having program instructions embodied therewith, wherein the program instructions are executable by one or more processors of one or more entities (e.g. one or more computerized unit 101) such as evoked above, to cause the one or more entities to perform the steps S10-S40, according to the present embodiments.

In embodiments, the program instructions are executable to further cause the one or more entities to vary S34 cutoff occupancies, while maintaining and monitoring S20 said virtual queues, according to principles described earlier. In addition, these program instructions may be executed to further cause the one or more entities to vary the fraction of arriving/departing data packets that are to be sampled by the nodes and, this, while maintaining S10 and monitoring S20 the virtual queues.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

According to an embodiment, a computer-implemented method for monitoring a computerized network is provided, wherein said network comprises several nodes that are, each, configured for receiving and/or sending data packets via one or more (physical) communication channels, such that physical queues of data packets arriving at and/or departing from each of the nodes may form in said one or more communication channels. According to this method, virtual queues are maintained, wherein each of said virtual queues simulates a queue of data packets in a virtual channel associated to one of said one or more (physical) communication channels, wherein the service rate of said virtual channel can be varied. The virtual queues maintained are further monitored. Finally, this method comprises varying a service rate of one or more virtual channels, on which queues are respectively simulated by one or more of the virtual queues maintained.

The service rate may for instance be varied within an interval that is between 10% and 400% of the actual service rate of the one or more communication channels.

The service rate may notably be varied by simulating a variation of interpacket gaps between packets conveyed on said one or more virtual channels, e.g., by simulating a flow control mechanism such as a link-level flow control mechanism.

Interestingly, the service rate may be increased to a value that is larger than the actual service rate of the one or more communication channels, e.g., by simulating an increase of a signaling speed of the one or more virtual channels.

In embodiments, the outcomes of the step of monitoring may be dynamically interpreted, to display images of quantities based on occupancies of said virtual queues. This interpretation may for instance comprise applying an isomorphic transformation of a network topology of said nodes, to map said quantities onto an array representing said virtual queues. Said quantities typically comprise occupancies of the virtual queues and gradients of said occupancies. Said occupancies and said gradients of occupancies may for instance be rendered by varying, in said images, and at each cell of said array, a brightness and a color, respectively.

According to another embodiment, a computer program product for monitoring a computerized network such as described above is provided, wherein the computer program product comprises a computer readable storage medium having program instructions embodied therewith, the program instructions being executable by one or more processors of one or more entities, to cause an apparatus to implement steps according to the above methods.

According to another embodiment, a computerized system is provided. The latter is configured for monitoring a computerized network such as above. The system comprises a monitoring unit connectable to said network to establish data communication therewith. The monitoring unit is an electronic circuit or processing unit that is programmed, designed, adapted or configured to: maintaining virtual queues; monitor the virtual queues maintained; and vary a service rate of one or more virtual channels, according to principles discussed above.

In embodiments, the computerized system further comprises a graphical user interface, via which images of quantities based on occupancies of said virtual queues can be displayed.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method for monitoring a computerized network, wherein said network comprises several nodes that are, each, configured for receiving and/or sending data packets via one or more communication channels, such that physical queues of data packets arriving at and/or departing from each of the nodes may form in said one or more communication channels, the method comprising:

maintaining virtual queues for one or more virtual channels, wherein each of said virtual queues simulates a queue of data packets for a respective one of the virtual channels that is associated to one of said one or more communication channels, wherein a service rate of each of the virtual channels is adjustable within an interval between a value lower than an actual service rate of the associated communication channel and a value higher than the actual service rate of the associated communication channel;

monitoring the virtual queues maintained; and while maintaining and monitoring said virtual queues, varying the service rate of at least one or more virtual channels, on which queues are respectively simulated by one or more of the virtual queues maintained.

2. The method of claim 1, wherein said service rate of the at least one of the one or more virtual channels is varied within the interval, and wherein the interval is between 10% and 400% of the actual service rate of the associated communication channel.

3. The method of claim 1, wherein the method further comprises, while maintaining and monitoring said virtual queues: varying a lower cutoff occupancy as to a queue occupancy of one or more of the virtual queues maintained, under which lower cutoff occupancy said virtual queue occupancy is considered to be zero by a computerized method used by said computer-implemented method for the purpose of monitoring said computerized network.

4. The method of claim 1, wherein the method further comprises, while maintaining and monitoring said virtual queues: varying a fraction of the data packets arriving at and/or departing from one or more of said nodes, which are to be sampled by said one or more of said nodes.

5. The method of claim 1, wherein varying said service rate of the at least one of the one or more virtual channels is performed by simulating a variation of interpacket gaps between packets conveyed on said the at least one of the one or more virtual channels.

6. The method of claim 1, wherein varying said service rate of the at least one of the one or more virtual channels comprises increasing said service rate to a value larger than the actual service rate of the associated one of said one or more communication channels.

7. The method of claim 1, further comprising dynamically interpreting outcomes of the step of monitoring of said virtual queues, to display images of quantities based on occupancies of said virtual queues.

8. The method of claim 1, further comprising monitoring said physical queues, while maintaining and monitoring said virtual queues.

9. The method of claim 3, wherein the method further comprises, while maintaining and monitoring said virtual queues: varying an upper cutoff occupancy as to said queue occupancy, above which upper cutoff occupancy said queue occupancy is considered to be maximal by said computerized method for the purpose of monitoring said computerized network.

10. The method of claim 5, wherein varying interpacket gaps is performed by simulating a flow control mechanism on the at least one of the one or more virtual channels, whereby receiver nodes impose an interpacket gap between packets sent by transmitter nodes on the at least one of the one or more virtual channels.

11. The method of claim 6, wherein increasing said service rate of the at least one of the one or more virtual channels comprises simulating an increase of a signaling speed of the at least one of the one or more virtual channels.

12. The method according to claim 7, wherein interpreting outcomes of the step of monitoring of said virtual queues comprises applying an isomorphic transformation of a network topology of said nodes, to map said quantities onto an array representing said virtual queues.

13. The method of claim 7, wherein the flow control mechanism simulated is a link-level flow control mechanism.

14. The method of claim 12, wherein said quantities comprise occupancies of said virtual queues and gradients of said occupancies.

15. The method of claim 14, wherein said occupancies and said gradients of occupancies are rendered by varying, in said images, and at each cell of said array, a brightness and a color, respectively.

16. A computer program product for monitoring a computerized network, wherein said network comprises several nodes that are, each, configured for receiving and/or sending data packets via one or more communication channels, such that physical queues of data packets arriving at and/or departing from each of the nodes may form in said one or more communication channels, the computer program product comprising a non-transitory computer readable storage medium having program instructions embodied therewith, the program instructions being executable by one or more processors of one or more entities, to cause an apparatus to perform:

maintaining virtual queues for one or more virtual channels, wherein each of said virtual queues simulates' a queue of data packets for a respective one of the virtual channels that is associated to one of said one or more communication channels, wherein a service rate of each of said virtual channels is adjustable within an interval between a value lower than an actual service rate of the associated communication channel and a value higher than the actual service rate of the associated communication channel;

monitoring the virtual queues maintained; and while maintaining and monitoring said virtual queues, varying the service rate of at least one of the one or more virtual channels, on which queues are respectively simulated by one or more of the virtual queues maintained.

17. The computer program product according to claim 16, wherein the program instructions are executable by one or more processors of one or more entities, to further cause to vary, while maintaining and monitoring said virtual queues, a lower cutoff occupancy as to a queue occupancy of one or more of the virtual queues maintained, under which lower cutoff occupancy said virtual queue occupancy is considered to be zero by a computerized method used by said computer-implemented method for the purpose of monitoring said computerized network, and to vary an upper cutoff occupancy as to said queue occupancy, above which upper cutoff occupancy said queue occupancy is considered to be maximal by said computerized method for the purpose of monitoring said computerized network.

18. The computer program product according to claim 16, wherein the program instructions are executable by one or more processors of one or more entities, to further cause to vary, while maintaining and monitoring said virtual queues, a fraction of data packets arriving at and/or departing from one or more of said nodes and which are to be sampled by said one or more of said nodes.

19. The computerized system of claim 17, wherein the at least one memory and the computer program code configured to, with the at least one processor, cause the computerized system to at least:

interpret outcomes of monitoring said virtual queues, to display, via a graphical user interface, images of quantities based on occupancies of said virtual queues.

20. A computerized system for monitoring a computerized network, wherein said network comprises several nodes that are, each, configured for receiving and/or sending data packets via one or more communication channels, such that physical queues of data packets arriving at and/or departing from each of the nodes may form in said one or more communication channels, the computerized system comprising:

at least one processor; and at least one non-transitory memory including computer program code, the at least one memory and the computer program code configured to, with the at least one processor, cause the computerized system to at least:

establish data communication with the network;

maintain virtual queues for one or more virtual channels, wherein each of said virtual queues simulates a queue of data packets for a respective one of the virtual channels associated to one of said one or more communication channels, wherein a service rate of each of the virtual channels is adjustable within an interval between a value lower than an actual service rate of the associated communication channel and a value higher than the actual service rate of the associated communication channel;

monitor the virtual queues maintained; and while maintaining and monitoring said virtual queues, vary the service rate of at least one of the one or more virtual channels, on which queues are respectively simulated by one or more of the virtual queues maintained.

* * * * *